(12) United States Patent
Okumura

(10) Patent No.: US 6,894,747 B2
(45) Date of Patent: May 17, 2005

(54) MANUFACTURING METHOD FOR REFLECTOR, REFLECTOR, AND LIQUID CRYSTAL DISPLAY

(75) Inventor: Hiroshi Okumura, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 29 days.

(21) Appl. No.: 10/227,952

(22) Filed: Aug. 27, 2002

(65) Prior Publication Data

US 2003/0048399 A1 Mar. 13, 2003

(30) Foreign Application Priority Data

Aug. 31, 2001 (JP) ........................................ 2001-264445

(51) Int. Cl.⁷ ........................................... G02F 1/1335
(52) U.S. Cl. ........................ 349/113; 438/29; 438/940
(58) Field of Search ........................... 349/113; 438/29, 438/30, 940, 39, 3; 430/945; 257/59

(56) References Cited

U.S. PATENT DOCUMENTS

| | | | | |
|---|---|---|---|---|
| 4,431,272 A | * | 2/1984 | Yazawa et al. | 349/113 |
| 4,456,336 A | * | 6/1984 | Chung et al. | 349/160 |
| 5,460,980 A | * | 10/1995 | Tran et al. | 438/29 |
| 5,691,792 A | * | 11/1997 | Mizushima et al. | 349/124 |
| 5,864,381 A | * | 1/1999 | Neal et al. | 351/205 |
| 5,936,688 A | * | 8/1999 | Tsuda et al. | 349/113 |
| 5,973,843 A | * | 10/1999 | Nakamura | 359/619 |
| 6,163,353 A | * | 12/2000 | Ting | 349/113 |
| 6,291,146 B1 | * | 9/2001 | Chang et al. | 430/394 |
| 6,429,919 B1 | * | 8/2002 | Takatsuka et al. | 349/113 |
| 6,458,612 B1 | * | 10/2002 | Chen et al. | 438/29 |
| 6,501,522 B2 | * | 12/2002 | Chang et al. | 349/113 |
| 6,525,792 B1 | * | 2/2003 | Fujioka et al. | 349/113 |
| 6,534,336 B1 | * | 3/2003 | Iwane et al. | 438/71 |
| 6,544,809 B2 | * | 4/2003 | Lim | 438/29 |
| 6,562,644 B2 | * | 5/2003 | Ishida et al. | 438/29 |
| 6,563,557 B2 | * | 5/2003 | Yamanaka et al. | 349/74 |
| 6,583,840 B1 | * | 6/2003 | Inoue et al. | 349/141 |
| 6,583,938 B1 | * | 6/2003 | Woodgate et al. | 359/625 |
| 6,597,421 B1 | * | 7/2003 | Hatanaka et al. | 349/110 |
| 6,600,534 B1 | * | 7/2003 | Tanaka et al. | 349/113 |
| 6,606,139 B2 | * | 8/2003 | Yoshii et al. | 349/114 |
| 6,618,107 B1 | * | 9/2003 | Tanaka et al. | 349/106 |
| 6,621,543 B2 | * | 9/2003 | Moon | 349/115 |
| 2001/0004513 A1 | * | 6/2001 | Chang et al. | 430/394 |
| 2001/0055089 A1 | * | 12/2001 | Van De Witte et al. | 349/185 |
| 2002/0089628 A1 | * | 7/2002 | Jang et al. | 349/113 |
| 2002/0140886 A1 | * | 10/2002 | Sugiura et al. | 349/113 |
| 2003/0038907 A1 | * | 2/2003 | Ikeno et al. | 349/113 |
| 2003/0189746 A1 | * | 10/2003 | Vernackt | 359/237 |
| 2003/0214717 A1 | * | 11/2003 | Kaminsky et al. | 359/599 |
| 2004/0070709 A1 | * | 4/2004 | Kanou et al. | 349/113 |

FOREIGN PATENT DOCUMENTS

| | | |
|---|---|---|
| EP | 0 462 439 A1 | 12/1991 |
| JP | 2000-250025 | 9/2000 |
| JP | 2001-194662 | 7/2001 |
| KR | 2000-57022 | 9/2000 |

* cited by examiner

Primary Examiner—Karl D. Frech
Assistant Examiner—Daniel Walsh
(74) Attorney, Agent, or Firm—Young & Thompson

(57) ABSTRACT

A flat organic insulating layer is formed on a substrate provided with thin film transistors by coating and baking. Next, a pulse-shaped laser beam is irradiated on the organic insulating layer and a contact hole and an undulation are formed in and on the organic insulating layer by ablation. The undulation is formed in such a way as to have four or more height levels.

9 Claims, 7 Drawing Sheets

MANUFACTURING METHOD FOR REFLECTOR, REFLECTOR, AND LIQUID CRYSTAL DISPLAY

BACKGROUND OF THE INVENTION

1. Field of the Invention

The present invention relates to a reflector having good reflecting characteristics and a liquid crystal display, which is equipped with the reflector and has good display characteristics, and a method of manufacturing them.

2. Description of the Related Art

There is known a reflection type liquid crystal display having a reflector provided in its inside which reflects incidental light to provide a display light. The reflection type liquid crystal display does not need a backlight as a light source. Therefore, the reflection type liquid crystal display has advantages, such as achieving lower power consumption and a thinner size, over a transmission type liquid crystal display. With those features, the reflection type liquid crystal display is used in a portable terminal or the like. A so-called transflective type liquid crystal display which has the capabilities of both the reflection type and the transmission type is also used in a portable phone or the like. Although the following discussion will describe the problems of the reflection type liquid crystal display, the transflective type liquid crystal display has similar problems.

The reflection type liquid crystal display has a liquid crystal filled in a liquid crystal cell, a switching element for driving the liquid crystal and a reflector provided inside or outside the liquid crystal cell. The reflection type liquid crystal display is, for example, an active matrix type liquid crystal display that uses switching elements, such as thin film transistors.

As a reflection type liquid crystal display, a liquid crystal display which has an undulation shape formed on the surface of a reflection electrode to improve the visibility has been developed. The reflection electrode, when having an undulated surface rather than a flat one, reflects incidental light in multiple directions. That is, forming an undulation shape on the surface of the reflection electrode may improve the display characteristics, such as a wider view angle.

While the undulation shape of the reflection electrode may increase the scattering characteristics of reflected light, there is a case where the interference of the reflected light causes darkening of the screen when the undulation shape has high regularity. To suppress the interference of light, therefore, it is desirable to form the undulation shape having as low regularity as possible.

As one method for providing an undulation shape on the surface of the reflection electrode, a method of forming an undulation shape on the surface of an insulating film has been exploited. In this method, a photosensitive resin film is formed first, which is exposed using an exposure mask and then developed, to form discontinued protruding patterns. Thereafter, the surface of the film is melted by heat treatment, thereby being formed a gentler shape. Then, an organic insulating film is formed on the resin film, being etched for a contact hole thereafter. Finally, a reflection electrode is formed on the insulating film. The undulation shape that is originated from the resin film and the insulating film is formed on the surface of the obtained reflection electrode.

According to the above-described method of forming the undulation shape, the undulation of the insulating film is formed with approximately a constant height, that is, the height of the undulation has substantially two values, because all of the protrusion of the resin film have substantially same height (thickness) value. Here, the height of the undulation means the difference between the height levels (depths) of the top portion and the bottom portion of the undulation in the normal direction of the reflector.

There is developed another method using so-called halftone mask, which method is described in Unexamined Japanese Patent Application KOKAI Publication No. 2000-250025. According to the method, the resin film is patterned using the halftone mask, which has different transmittance in its masking area, so that the protrusions are formed with different height values. However, the number of the height values are substantially two, therefore, the height of the undulation formed on the insulation film has three values.

As explained above, conventionally, the height of the undulation was so set as to have three values at most. Therefore, the undulation shape of the conventional reflector had relatively high regularity and was rather monotonous.

The high regularity of the undulation shape does not provide a good reflecting characteristics and display characteristics. Therefore, the conventional reflector, which was restricted in the number of available values of the height of the undulation of the insulating film, did not have sufficiently improved display characteristics.

Moreover, the above method of forming an undulation on an insulating film requires relatively many steps, that is, formation of two organic films (the resin film and the insulation film), and exposure and development. Further, the undulation formed by using the photolithography technique has a sharp shape, thus requiring a following heat treatment step to make the surface shape gentler. Therefore, the conventional method that uses the photolithography technique has a shortcoming of involving a relatively large number of steps.

As explained above, the conventional reflector had problems such that the undulation shape of the reflection electrode, particularly, the height, had a relatively high regularity so that a sufficiently high reflecting characteristics may not be achieved. Further, the manufacturing method for this reflector had such a problem as to require a relatively large number of steps.

SUMMARY OF THE INVENTION

In view of the above circumstances, it is an object of the present invention to provide a reflector and a liquid crystal display, which have a good reflecting characteristic, and a method of manufacturing the reflector.

It is another object of the present invention to provide a reflector and a liquid crystal display, which can be manufactured in substantially fewer steps, and a method of manufacturing the reflector.

To achieve the above objects, a manufacturing method for a reflector according to a first aspect of the present invention comprising the steps of:

forming an insulating layer;

irradiating said insulating layer with a laser beam to thereby form an undulation on a surface of said insulating layer by ablation; and forming an electrode on said insulating layer.

In this case, in said ablation step, said laser beam may be irradiated on said insulating layer with a predetermined intensity distribution.

In this case, said laser beam may be irradiated on said insulating layer via a mask having a predetermined transmittance distribution.

In this case, said laser beam incident to said mask may have a flat profile.

In this case, scanning irradiation may be performed with said laser beam which has a spot shape.

In this case, in said ablation step, said laser beam may be irradiated with a pulse shape.

In this case, in said ablation step, said undulation may be so formed as to have four or more height levels.

In this case, a switching element may be provided under said insulating layer, and a contact hole through a bottom of which one end of said switching element may be exposed is formed in said ablation step.

In this case, in said ablation step, a flat portion may be formed together with said undulation on said insulating layer, and the method may further comprise a step of forming a transparent electrode on said flat portion.

The above manufacturing method may further comprise a step of annealing said insulating layer after said ablation step.

To achieve the above objects, a reflector according to a second aspect of the present invention comprising:

an insulating layer provided on a substrate and having an multi-stage undulation with at least four height levels on a surface; and an electrode provided on said insulating layer.

To achieve the above objects, a liquid crystal display according to a third aspect of the present invention having the reflector as recited above.

DETAILED DESCRIPTION OF THE PREFERRED EMBODIMENTS

Preferred embodiments of the invention will now be described with reference to the accompanying drawings. The following will describe one embodiment of the invention, which is to be considered as illustrative and not restrictive.

First Embodiment

A liquid crystal display according to the first embodiment of the invention is an active matrix type liquid crystal display which has switching elements, such as thin film transistors (TFTs), pixel by pixel.

Figure 1:
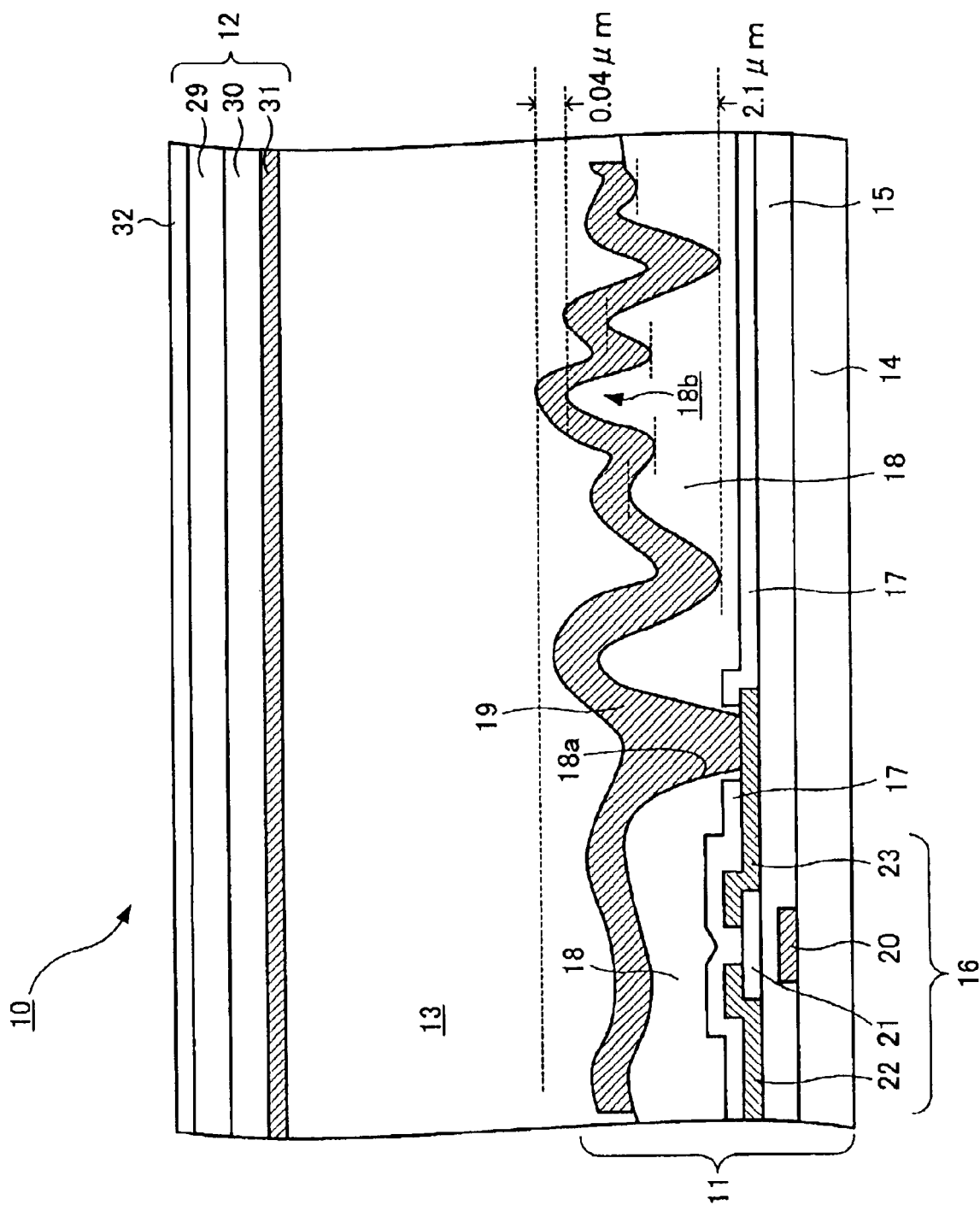
FIG. 1 shows the cross-sectional structure of a liquid crystal display according to a first embodiment of the invention.

FIG. 1 is a cross-sectional view of a unit pixel area of a liquid crystal display 10 according to the embodiment. As shown in FIG. 1, the reflection type liquid crystal display 10 has a lower substrate 11 which constitutes a reflector, an opposite substrate 12 so arranged as to face the lower substrate 11 and a liquid crystal layer 13 sandwiched between the lower substrate 11 and the opposite substrate 12.

The lower substrate 11 has an insulative substrate 14, an insulating protection film 15, TFTs 16, a passivation film 17, an organic insulating layer 18 and a reflection electrode 19.

The insulating protection film 15 of an inorganic or organic insulation material is deposited on the insulative substrate 14. The TFTs 16 that function as switching elements are formed on the insulating protection film 15.

Each TFT 16 has a gate electrode 20 formed on the insulative substrate 14, a semiconductor layer 21 which overlies the gate electrode 20 with the insulating protection film 15 in between, a drain electrode 22 and a source electrode 23. The drain electrode 22 and source electrode 23 are respectively connected to the unillustrated drain region and source region of the semiconductor layer 21.

The passivation film 17 is comprised of an insulating film, such as, for example, a silicon-based film. The passivation film 17 is provided in such a way as to cover each TFT 16, excluding a portion where a contact hole 18a to be discussed later is to be formed.

The organic insulating layer 18 is formed on the passivation film 17. The organic insulating layer 18 is comprised of an organic material, which is easily burned out and sublimated by laser ablation to be discussed later.

The "laser ablation" is a phenomenon such that as a laser beam of a predetermined range of wavelength is irradiated on an organic material having an absorption band in a predetermined wavelength range, the chemical bonds in the organic material are broken so that the irradiated surface layer is evaporated (removed).

That is, the organic insulating layer 18 is formed of the organic material that may absorb a laser beam of the wavelength used in ablation. The following description will be given of a case where the organic insulating layer 18 is formed of a polyimide resin.

Formed in the organic insulating layer 18 is the contact hole 18a through the bottom of which the source electrode 23 is exposed. An undulation 18b is formed in the surface of the organic insulating layer 18. The undulation 18b and the contact hole 18a are formed by laser ablation as will be discussed later.

The undulation 18b of the organic insulating layer 18 is formed in such a way that its height takes multiple values. The "height" of the undulation 18b is the height of the top portion or the bottom portion with a predetermined position in the normal direction of the reflector as a reference. In this embodiment, the position of the organic insulating layer 18 (the thickness of the organic insulating layer 18) before the formation of the undulation 18b is taken as the reference.

As shown in FIG. 1, the undulation 18b of the organic insulating layer 18 has multiple heights, particularly, four or more height values, within a predetermined range. In case where the organic insulating layer 18 is formed 3 $\mu$m thick, for example, the height of the undulation 18b has four or more values of heights within a range of, for example, 0.04 $\mu$m to 2.1 $\mu$m.

The reflection electrode 19 is formed of metal, such as aluminum or chromium, with a predetermined thickness on the organic insulating layer 18 including the contact hole 18a. The reflection electrode 19 is connected to the source electrode 23 of the TFT 16 via the contact hole 18a, and serves as a pixel electrode and light reflecting layer.

Formed in the surface of the reflection electrode 19 is an undulation shape which is originated from the undulation 18b on the surface of the organic insulating layer 18. As the undulation 18b of the organic insulating layer 18 has multiple height values and is formed to have multiple stages, the undulation formed on the reflection electrode 19 is likewise formed to have multiple stages and has a low regularity. Therefore, light to be reflected by the reflection electrode 19 has a high scattering characteristics, which provides the lower substrate 11 with a high reflecting characteristics and, thereby provides the liquid crystal display 10 having the lower substrate 11 with good display characteristics.

The opposite substrate 12 has a color filter 30 and a transparent electrode 31 laminated in order on one surface of a transparent insulative substrate 29. A sheet polarizer 32 is formed on the other surface of the insulative substrate 29.

The liquid crystal layer 13 is formed by using a liquid crystal of an TN (Twisted Nematic) type, an STN (Super Twisted Nematic) type, a single sheet polarizer type, a GH (Guest-Host) type, a PDLC (Polymer Dispersed Liquid Crystal) type, a cholesteric type or the like. A predetermined orientations given to the liquid crystal layer 13.

The operation of the liquid crystal display 10 with the above-described structure will be described below.

In white mode, light incident to the display surface passes through the insulative substrate 29, the color filter 30, the transparent electrode 31 and liquid crystal layer 13 and reaches the surface of the reflection electrode 19.

As the undulation is formed on the reflection electrode 19, the incidental light is scattered and reflected by the undulation. The reflected light passes through the liquid crystal layer 13, the transparent electrode 31, the color filter 30, the insulative substrate 29 and the sheet polarizer 32, and returns to the outside as display light.

In black mode, on the other hand, while the incidental light is likewise reflected at the reflection electrode 19 as in white mode, it is blocked by the sheet polarizer 32 and is not therefore output to the outside. The light ON/OFF operation of the liquid crystal display 10 is carried out this way.

A description will now be given of a manufacturing method for the reflector (lower substrate 11) of the liquid crystal display. FIGS. 2A through 2D illustrate manufacturing steps.

Figure 2A:
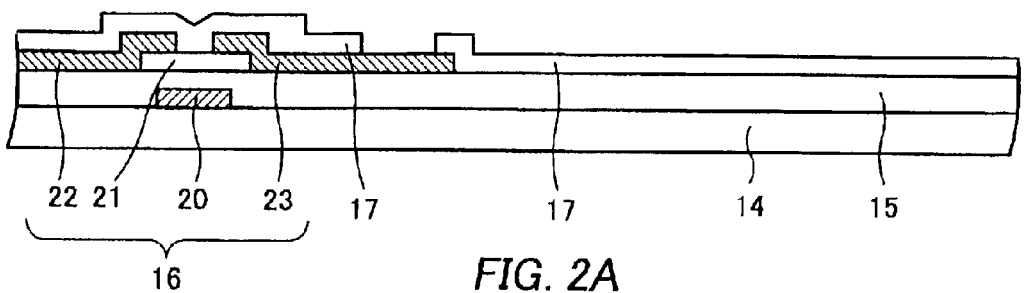
FIGS. 2A through 2D show manufacturing steps for a reflector according to the embodiment.

First, each TFT 16 as a switching element is formed on the insulative substrate 14. That is, the gate electrode 20 is formed on the insulative substrate 14 and the insulating protection film 15 covering the gate electrode 20 is then formed. Next, the semiconductor layer 21 having an unillustrated drain region and source region is formed on the insulating protection film 15 by etching, impurity doping, etc. Then, the drain electrode 22 and the source electrode 23, which respectively contact the drain region and the source region, are formed on the insulating protection film 15. Further, the passivation film 17 is formed on the TFT 16 and is patterned to have a resultant structure as shown in FIG. 2A.

Figure 2B:
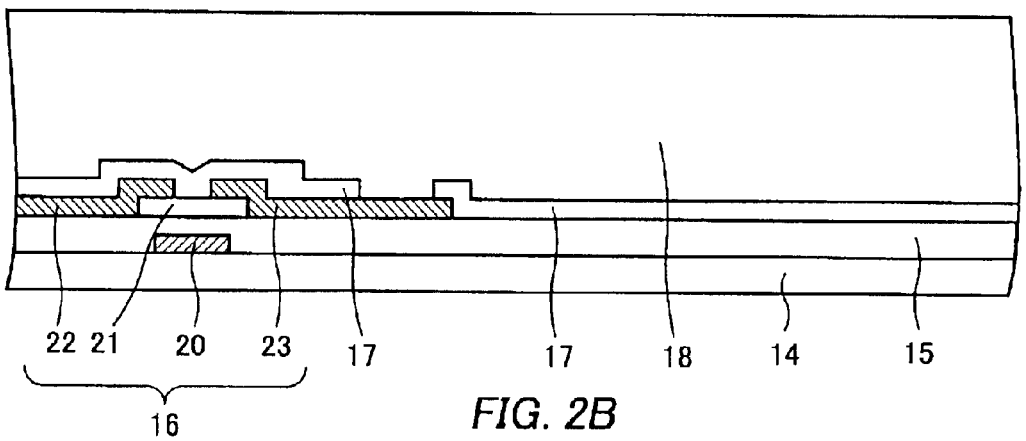

Next, polyimide is coated on the surface of the resultant structure and baked, thus forming the flat polyimide film 35 with a thickness of, for example, 3 $\mu$m (FIG. 2B). Baking is carried out, for example, at a temperature of 90° C. for ten minutes.

Figure 2C:
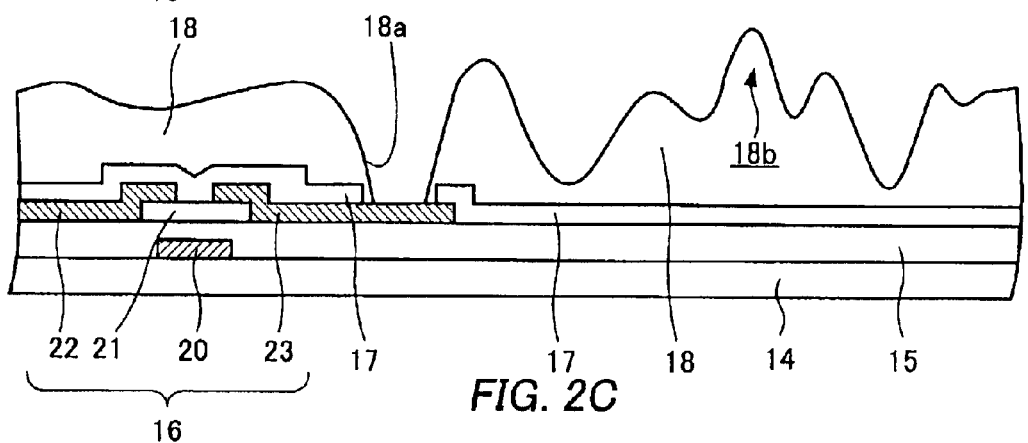

Subsequently, laser ablation is performed on the polyimide film 35 to form the organic insulating layer 18 having the contact hole 18a and the undulation 18b as shown in FIG. 2C.

Figure 3:
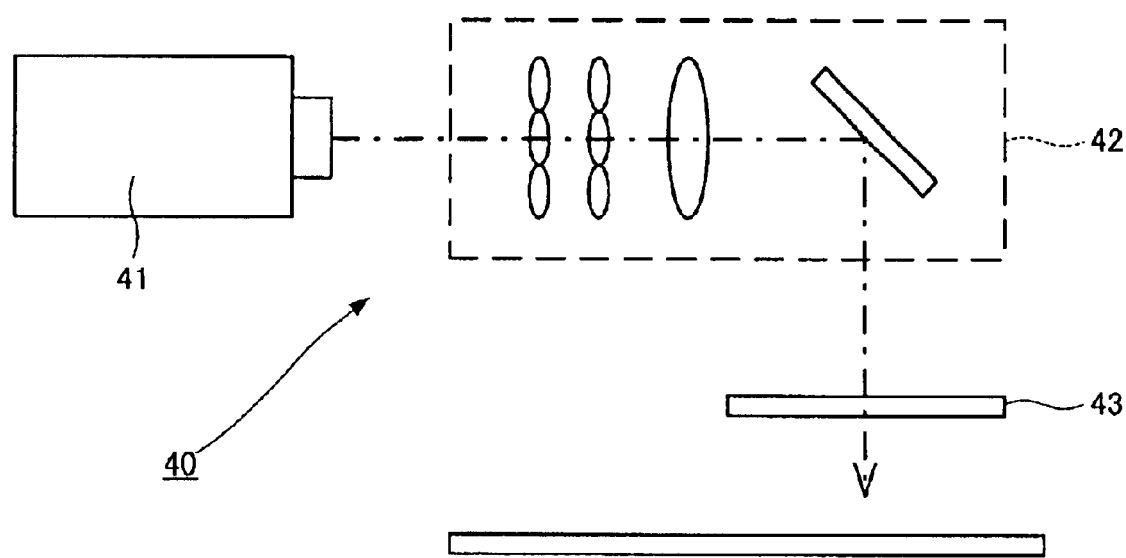
FIG. 3 depicts the structure of an optical processing system.

FIG. 3 depicts the structure of an optical processing system 40 which is used in laser ablation. The optical processing system 40 shown in FIG. 3 comprises a light source 41, a shaping section 42 and a mask 43.

The light source 41 emits a pulse-shaped laser beam, e.g., a KrF excimer laser beam (wavelength of 248 nm). The laser beam is irradiated with a predetermined number of pulses and such an intensity as to be able to ensure a good ablation profile. For example, the laser beam is irradiated with such intensity that the energy density irradiated onto the portion of the polyimide film 35 where the contact hole 18a is to be formed is 300 mJ/cm$^2$.

Figure 4:
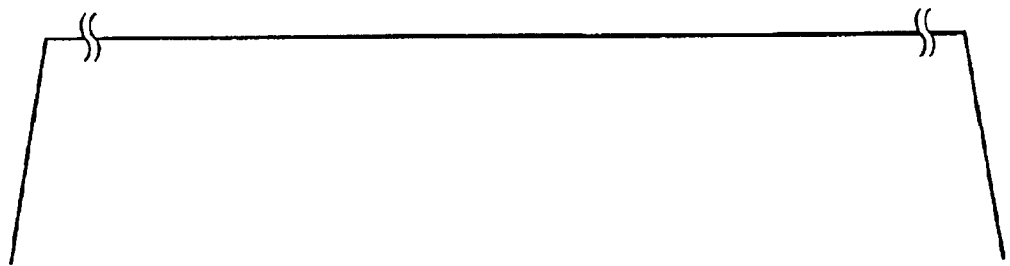
FIG. 4 shows the profile of a flat top type laser beam.

The shaping section 42 comprises a flyeye lens, a cylindrical lens, a mirror and so forth, and shapes the pattern of the laser beam to a flat top type profile as shown in FIG. 4. The shaped laser beam is irradiated toward the polyimide film 35 as a target, e.g., approximately perpendicularly.

The mask 43 is located between the shaping section 42 and an object to be irradiated, so that the laser beam coming out of the shaping section 42 is irradiated via the mask 43 onto the polyimide film 35, the irradiation target. The surface portion of the polyimide film 35 that has been irradiated with the laser beam is vanished (removed) by ablation.

The mask 43 is comprised of a so-called dielectric mask which can adjust the light transmittance to the desired one. That is the mask 43 is comprised by forming a dielectric film (not shown) patterned to a predetermined shape on a transparent substrate of quartz or the like.

The dielectric film is comprised of a film of, for example, $SiO_2$, $Al_2O_3$, $HfO_2$, $YF_3$, $MgF_2$, $LaF_3$, $ThF_4$ or the like or the lamination of those films, and is formed on the substrate by the ordinary film deposition method. The dielectric film is provided like islands in the substrate surface in a predetermined shape using the ordinary patterning method. The dielectric film has, for example, approximately a planar shape. The islands of the dielectric film are formed in predetermined thickness to realize the desired light transmittance. Setting each of the material and thickness of the dielectric film in the mask surface in predetermined distributions can achieve the desired light intensity (energy density) distribution in the irradiation surface.

The degree of ablation differs in proportion with the level of the energy density, so that the dielectric film can be removed at different depths. Specifically, while no dielectric film is provided in an area corresponding to the contact hole 18a, the dielectric film is provided to a predetermined thickness on an area corresponding to the portion where the undulation 18b is to be formed. Irradiating the laser beam via the thus formed mask 43 can form the contact hole 18a and the undulation 18b in and on the polyimide film 35. The depth of ablation can also be adjusted by the number of pulses of the laser beam to be irradiated.

Figure 5:
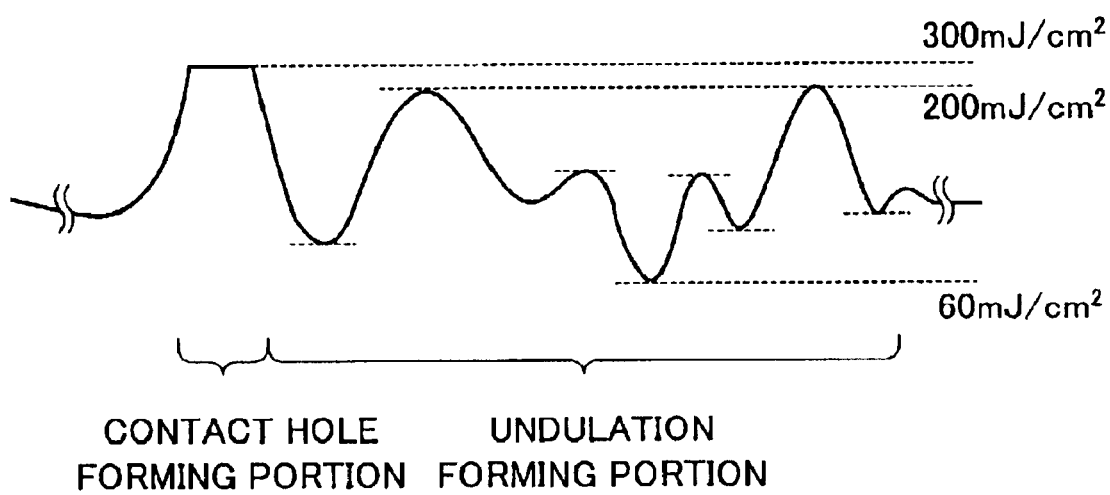
FIG. 5 shows the profile of a laser beam which has passed a mask.

The laser beam passes the mask 43 to be shaped into a profile as shown in, for example, FIG. 5 from the one shown in FIG. 4. Irradiating the shaped laser beam as illustrated can form the contact hole 18a and the undulation 18b as shown in FIG. 1 in and on the polyimide film 35.

In the profile shown in FIG. 5, the laser beam which is irradiated onto the portion where the contact hole 18a is to be formed is not attenuated by the dielectric film and has a flat shape. As mentioned above, the energy density of the laser beam is set to such a value as to be able to adequately shape the polyimide film 35 of a predetermined thickness. The energy density of the flat portion corresponding to the portion where the contact hole 18a is to be formed is, for example, 300 mJ/cm$^2$.

On the other hand, the profile of the energy density corresponding to the portion where the undulation 18b is to be formed shows multiple peak values, at least four peak values (maximum values or minimum values), within the aforementioned range. The peak values lie in the range of, for example, 60 mJ/cm$^2$ to 200 mJ/cm$^2$.

The irradiation of the laser beam whose profile has such multiple peak values forms the undulation 18b having bottom portions and top portions corresponding to the peak values in the polyimide film 35. As the profile has four or more peak values, the undulation 18b to be formed has four or more heights.

Irradiating the laser beam with a predetermined intensity distribution onto the polyimide film 35 via the mask 43 in the above-described manner, the organic insulating layer 18 having the multi-stage undulation 18b as shown in FIG. 2C is formed.

Patterning using ablation provides a gentler shape as compared with patterning using the ordinary photolithography technique. Unlike the case of using the photolithography technique, therefore, annealing is not essential. If necessary, however, annealing may be performed at a temperature of 250° C. for one hour to make the undulation 18b on the surface gentler.

Figure 2D:
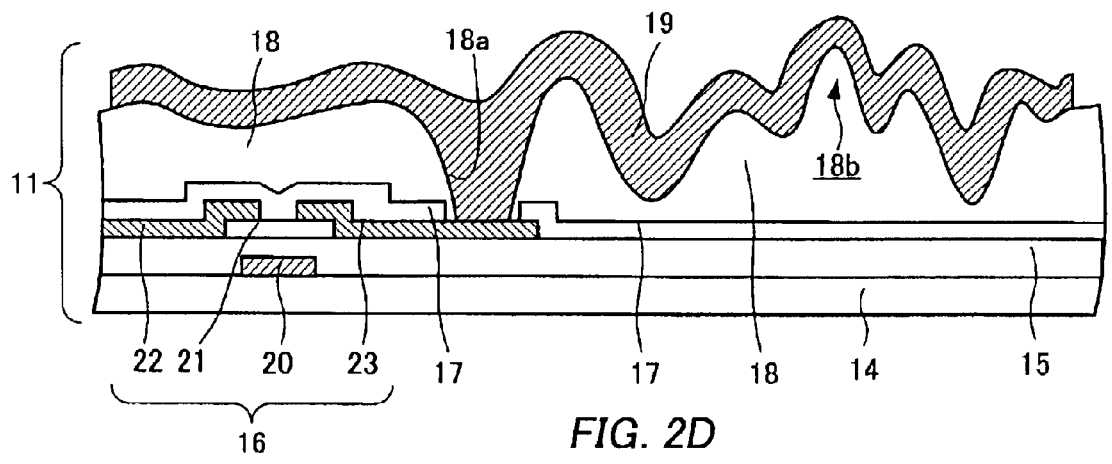

After the formation of the organic insulating layer 18, an aluminum film, for example, is formed on the organic insulating layer 18 and is then patterned to form the reflection electrode 19 as a reflection pixel electrode (FIG. 2D). The lower substrate 11 as the reflector can be fabricated in the above-described manner.

An unillustrated spacer is placed between the thus formed lower substrate 11 and the opposite substrate 12 which has the color filter 30, etc. laminated on the insulative substrate 14 and the liquid crystal 13 is filled and sealed in the space (cell) formed by the spacer. Then, the sheet polarizer 32 is attached by adhesion or the like, thereby yielding the reflection type liquid crystal display 10 shown in FIG. 1.

According to the embodiment, as described above, the multi-stage undulation 18b having at least four heights is formed on the organic insulating layer 18 by laser ablation. The multi-stage undulation 18b of the organic insulating layer 18 form an undulated surface with a lower regularity on the overlying reflection electrode 19. This realizes the reflector and the liquid crystal display 10, which have a high light scattering characteristics and excellent display characteristics.

The multi-stage undulation 18b of the organic insulating layer 18 is formed by irradiating a laser beam on the organic film via the mask 43 which has a predetermined transmittance distribution. The transmittance distribution of the mask 43 can be set arbitrarily and the height of the undulation 18b can easily set to multiple stages by adjusting the transmittance distribution and the number of irradiation pulses.

As the polyimide film 35 is processed directly by laser ablation, it is possible to manufacture the reflector and the liquid crystal display in substantially fewer steps. That is, in the case of using the ordinary photolithography technique, there is needed such steps, as the formation of a resist film and an organic film thereon, exposure and development, whereas in the case of using ablation, the organic insulating layer 18 having the contact hole 18a and the undulation 18b can be formed in at lest one step.

Further, in the photolithography process, the undulation 18b has a sharp shape, which requires annealing. In the ablation method, however, the surface of the undulation 18b is relatively gentle. Therefore, annealing should not necessarily be performed, thus allowing the organic insulating layer 18 to be formed in much fewer steps.

The first embodiment uses a so-called dielectric mask having a dielectric film. However, the mask 43 is not limited to this type, and may be of any type as long as it can control the light transmittance as desired.

Although the contact hole 18a and the undulation 18b are formed at the same time in the ablation step, they may be formed in separate steps using different masks.

Second Embodiment

A description will now be given of a method of manufacturing a reflector according to the second embodiment. To make understanding the second embodiment easier, same reference symbols are given to those components which are the same as the corresponding components of the first embodiment and their descriptions will be omitted.

In the second embodiment, unlike the first embodiment, the mask 43 is not used and scanning irradiation is performed with a laser beam having a spot-like shape to form the undulation 18b, etc. on the organic insulating layer 18. The following will discuss the manufacturing method according to the second embodiment.

It is to be noted that in the embodiment to be discussed below, the organic insulating layer 18 is formed of acrylic resin to a thickness of 3 µm by baking at 150° C. for one hour.

Figure 6:
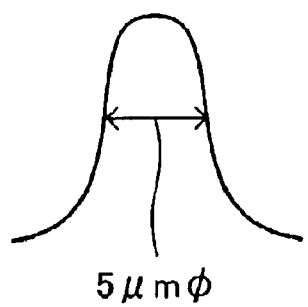
FIG. 6 shows the profile of a spot-shaped laser beam.

The laser beam used in the second embodiment has a spot-like profile which shows a Gaussian distribution as shown in FIG. 6. The energy density of the laser beam at the top portion of the spot-like profile is set within a predetermined range.

The spot-like laser beam is irradiated on a target (substrate) using an apparatus similar to the one used in the first embodiment. The substrate is placed on, for example, an X-Y stage and is movable on a plane. At the time of laser processing, the substrate is intermittently moved in a predetermined pattern. The laser beam is irradiated in a predetermined number of pulses in synchronism with the movement of the substrate. Another structure may be used which irradiates a scanning laser beam with the target substrate fixed.

On the surface of the acrylic resin film irradiated with the laser beam, the acrylic resin in the irradiated portion is burned out and sublimated by ablation. The energy density and the number of pulses of the laser beam to be irradiated are adjusted for each predetermined region. The irradiation while changing the laser beam intensity can form the contact hole 18a and the undulation 18b having multiple stages of depths in and on the organic insulating layer 18.

In the embodiment which ablates acrylic resin, for example, an XeCl excimer laser beam (wavelength of 308 nm) whose profile has a diameter of 5 µmø at a half-width can be used. In this case, the multi-stage undulation 18b having four or more height values as shown in FIG. 2C can be formed on the surface of the acrylic resin film by irradiating a predetermined number of pulses of the laser beam with multiple values such that the energy density at the top portion of the profile lies within a range of, for example, 40 to 190 mJ/cm$^2$. Further, the contact hole 18a can be formed by irradiating, for example, eight pulses of the laser beam that has an energy density of 300 mJ/cm$^2$ at the top portion of the profile.

According to the second embodiment, as described above, the multi-stage undulation 18b and the contact hole 18a can be formed on and in the organic film by irradiating a predetermined number of pulses of a spot-like laser beam while relatively moving the laser beam in a predetermined pattern. Apparently, the second embodiment can provide the same advantages as the first embodiment.

Although the substrate as a target is moved in the second embodiment, the irradiation port for the laser beam may be moved instead.

Third Embodiment

A description will now be given of the third embodiment with reference to the accompanying drawings. To make understanding the second embodiment easier, same reference symbols are given to those components which are the same as the corresponding components in FIG. 1 and their descriptions will be omitted.

Figure 7:
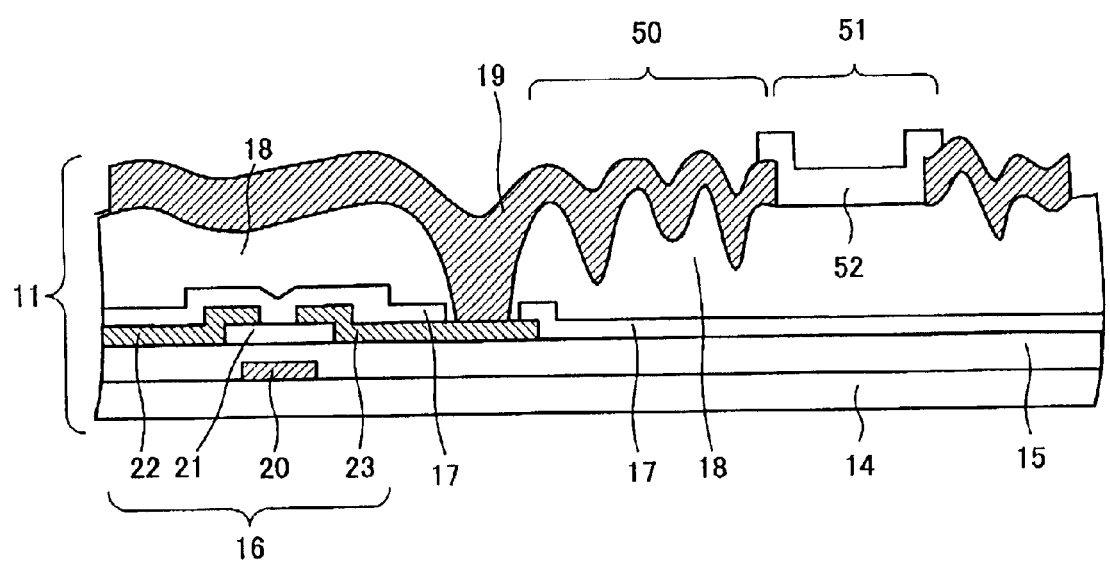
FIG. 7 illustrates the cross-sectional structure of a reflector according to a third embodiment of the invention.

FIG. 7 illustrates the structure of a reflector (lower substrate 11) according to the third embodiment. The reflector according to the third embodiment is used in a so-called transflective type liquid crystal display that has the functions of both the reflection type and the transflective type.

As shown in FIG. 7, a reflector 11 according to the third embodiment has a reflection area 50 and a transmission area 51.

A reflection electrode 19 is formed on the reflection area 50 of the organic insulating layer 18. There is formed a multi-stage undulation in the surface of the reflection area 50.

A transparent electrode 52 of ITO (Indium Tin Oxide) is formed on the organic insulating layer 18 in the transmission area 51. The surface of the organic insulating layer 18 in the transmission area 51 is formed nearly flat. So is the transparent electrode 52. The transparent electrode 52 contacts the reflection electrode 19 to be electrically connected thereto. A structure in which an insulating film which separates the transparent electrode 52 from the reflection electrode 19 is provided and the transparent electrode 52 and the reflection electrode 19 are connected to each other via the contact hole 18a may be employed instead.

The liquid crystal display 10 equipped with the reflector that has the reflection electrode 19 and the transparent electrode 52 functions as a so-called transflective type liquid crystal display that has the functions of both the reflection type and the transflective type.

The reflector 11 shown in FIG. 7 can be manufactured in the same method as used for the first embodiment. This method will be discussed below with reference to FIGS. 8A to 8D.

Figure 8A:
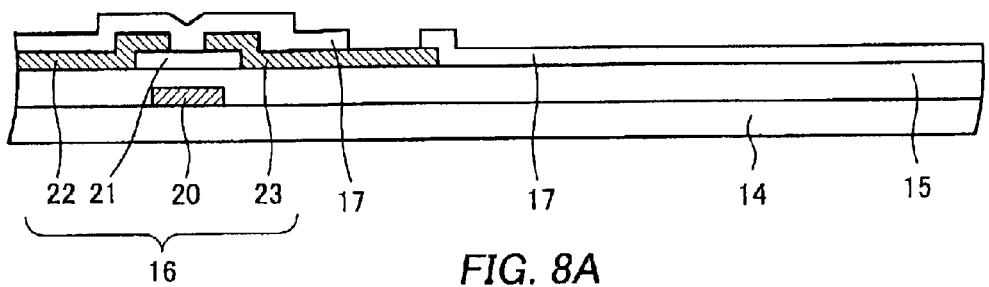
FIGS. 8A through 8D show manufacturing steps for the reflector as shown in FIG. 7.
Figure 8B:
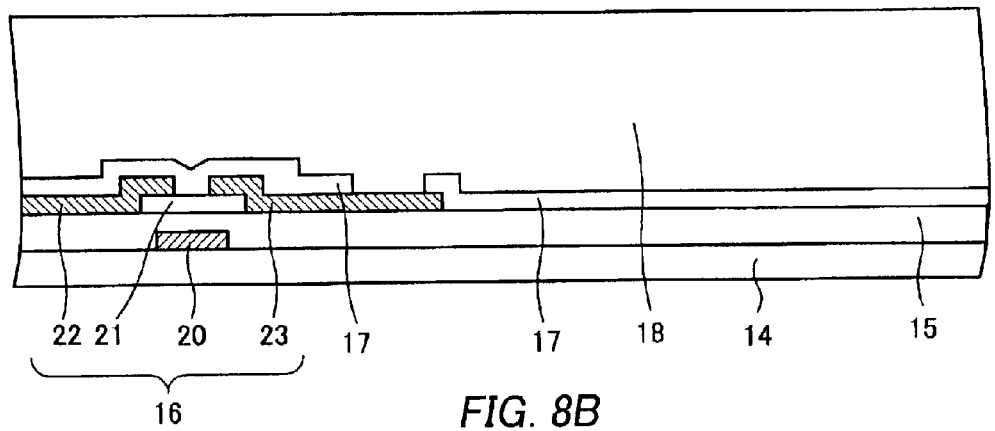

First, a substrate having the TFTs 16 as shown in FIG. 8A is prepared. Next, the polyimide film 35 is formed to a thickness of, for example, 2 $\mu$m on the substrate as shown in FIG. 8B. For example, the polyimide film 35 is formed by baking at 110° C., ten minutes.

Figure 8C:
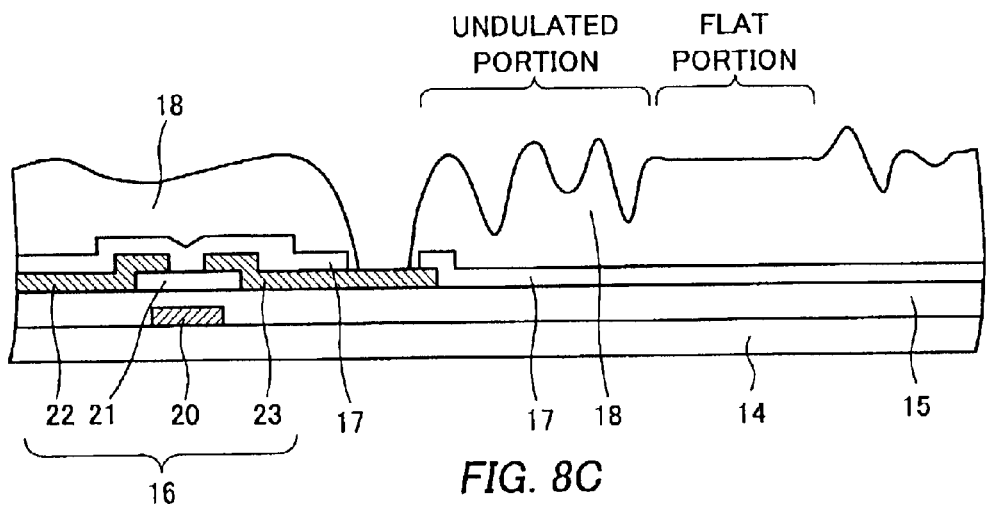

Then, the polyimide film 35 is subjected to laser processing to form the organic insulating layer 18 having a shape as shown in FIG. 8C as per the first embodiment.

Figure 9:
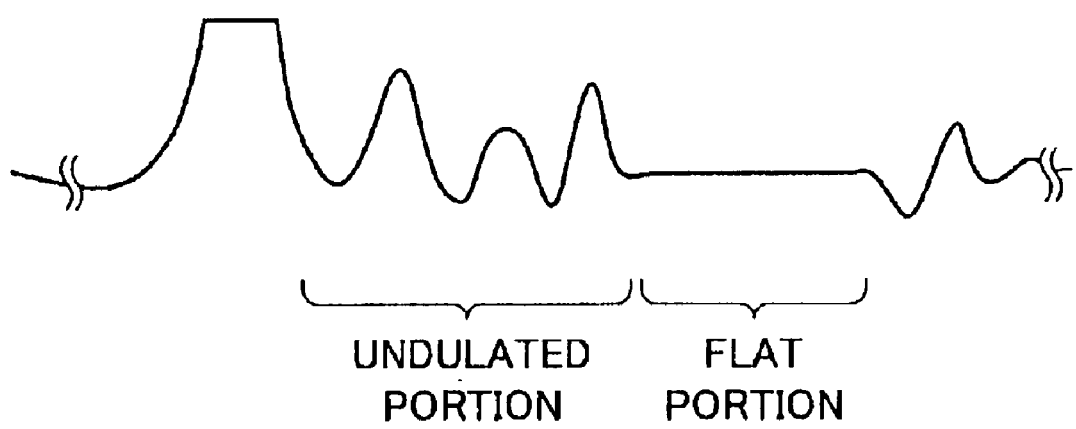
FIG. 9 shows the profile of a laser beam which is irradiated.

In the third embodiment, a laser beam having a profile as shown in FIG. 9 is irradiated. The energy density of the laser beam is set to a range of, for example, 30 to 250 mJ/cm$^2$ and the number of irradiation pulses is, for example, 10.

As shown in FIG. 9, the profile of the laser beam that has passed the mask 43 has a flat steady energy portion and an undulated portion. The irradiation of the laser beam whose profile has an undulated portion and a flat portion forms an undulated portion and a flat portion as shown in FIG. 8C on the polyimide film 35.

Figure 8D:
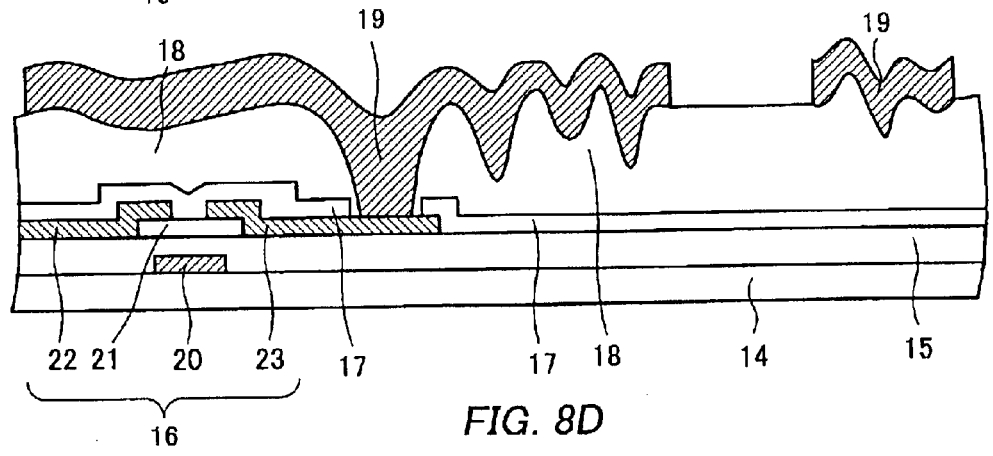

Next, for example, a thin chromium film is formed on the organic insulating layer 18, then patterning as shown in FIG. 8D is performed to remove the thin chromium film on the flat portion. The transparent electrode 52 of ITO or the like is formed on the exposed flat portion of the organic insulating layer 18. This completes the reflector shown in FIG. 7.

As described above, the third embodiment provides the reflector that has the reflection electrode 19 having a multi-stage undulation and the flat transparent electrode 52. The undulated portion and flat portion of the organic insulating layer 18 where the transparent electrode 52 and the reflection electrode 19 are to be formed respectively can be formed in a single step by laser ablation. The reflector shown in FIG. 7 and the transflective type liquid crystal display 10 equipped with the reflector can be manufactured in a substantially reduced number of steps.

In the first to third embodiments, the organic insulating layer 18 is formed of polyimide or acrylic resin. However, the organic insulating layer 18 can be formed of a resin which has a predetermined light absorbing range, such as a polyimide resin, epoxy resin, acrylic resin, cyclic olefin or novolak resin.

The laser ablation process can be carried out by selecting a laser beam in use in accordance with the type of the organic material used for the organic insulating layer 18. Available laser beam is ultraviolet light beam of, for example, ArF laser (193 nm), KrF laser (248 nm), Xecl laser (308 nm) or XeF laser (351 nm), or infrared light beam of, for example, a YAG (Yttrium Aluminum Garnet) laser (1.065 $\mu$m) or carbon-dioxide laser (10.6 $\mu$m).

The invention can be similarly adapted to a reflector and a liquid crystal display which use staggered structure TFTs or so-called channel protection type TFTs.

Although the TFTs 16 are used as switching elements, the invention is not limited to this particular type but can also be adapted to an active matrix type liquid crystal display which uses other switching elements, such as MIM (Metal-Insulator-Metal) elements, diodes or varistors, or a passive matrix type liquid crystal display which does not use switching elements.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

The invention is based on Japanese Patent Application No. 2001-264445 filed on Aug. 31, 2001 and this application includes the specification, the claims, the drawings and the abstract of the basic application. What is disclosed in the Japanese patent application is entirely incorporated in this specification by reference.

What is claimed is:

1. A manufacturing method for making a reflector, comprising the steps of:
    forming an insulating layer using an organic material having an absorption band in a predetermined wavelength range;
    forming protrusions on the insulating layer by ablation by irradiating a laser beam of a predetermined range of wavelengths on the insulating layer to break chemical bonds in the organic material and evaporate the surface of the insulating layer; and
    forming an electrode on the insulating layer.

2. The method of claim 1, wherein the laser beam is irradiated through a mask that has plural different transmittance levels for the laser beam and the ablation forms in the insulating layer plural valleys separated by peaks, the peaks having at least four different heights.

3. The manufacturing method according to claim 1, wherein scanning irradiation is performed with said laser beam which has a spot shape.

4. The manufacturing method according to claim 1, wherein in said ablation step, said laser beam is irradiated with a pulse shape.

5. The manufacturing method according to claim 1, further comprising the steps of forming a switching element under said insulating layer, and forming a contact hole through a bottom of which one end of said switching element is exposed.

6. The manufacturing method according to claim 1, further comprising the steps of forming a flat portion on said insulating layer, and forming a transparent electrode on said flat portion.

7. The manufacturing method according to claim 1, further comprising a step of annealing said insulating layer after said irradiating step.

8. The method of claim 2, wherein the valleys have at least four different heights that are different from the heights of the peaks.

9. The manufacturing method according to claim 2, wherein said laser beam incident to said mask has a flat profile.

* * * * *